United States Patent [19]

Stanic

[11] Patent Number: 4,468,001
[45] Date of Patent: Aug. 28, 1984

[54] SHUT OFF VALVE FOR FLUIDS

[76] Inventor: Miodrag Stanic, G. G. Deza 43/13, Novi Beograd, Yugoslavia

[21] Appl. No.: 413,398

[22] Filed: Aug. 31, 1982

[30] Foreign Application Priority Data

Sep. 3, 1981 [YU] Yugoslavia ............................ 2120/81

[51] Int. Cl.³ ........................ F16K 25/00; F16K 31/50
[52] U.S. Cl. ..................................... 251/86; 137/315; 137/454.5; 251/268; 251/270
[58] Field of Search ............... 137/454.2, 454.5, 454.6, 137/315; 251/86, 268, 270

[56] References Cited

U.S. PATENT DOCUMENTS

| | | | |
|---|---|---|---|
| 2,089,848 | 8/1937 | Hoferle | 137/454.2 |
| 2,213,998 | 9/1940 | Sifkovitz | 251/268 |
| 2,520,092 | 8/1950 | Fredrickson et al. | 137/454.5 |
| 3,006,361 | 10/1961 | Reinemann | 251/270 |
| 3,052,258 | 9/1962 | Keller | 137/454.5 |
| 3,389,717 | 6/1968 | Povalski et al. | 137/454.5 |
| 4,109,672 | 8/1978 | Szemeredi | 251/268 |
| 4,368,754 | 1/1983 | Roberts | 251/268 |

FOREIGN PATENT DOCUMENTS

| | | | |
|---|---|---|---|
| 432095 | 3/1948 | Italy | 251/270 |
| 18591 | of 1914 | United Kingdom | 251/268 |

Primary Examiner—George L. Walton
Attorney, Agent, or Firm—Cushman, Darby & Cushman

[57] ABSTRACT

In order to minimize wear and an over tightening effect in a shut-off valve (10) intended primarily for sanitation valves, which has a valve housing (12) a valve piston (16) that can be displaced axially by the operation of an element such as a handle (52) with a valve head (18) which can be lowered onto a valve seat (20) and raised from this and which is arranged upwards in the direction of flow relative to this, the valve piston is housed in a holding element (40) which can be displaced by means of a cylinder-shaped guide element (32) used to achieve the axial movement, which, with its (lower) edge area (36) is housed by the valve housing (12) and with the other (upper) edge area interacts with a further element (30) that holds the valve seat, in which connection the guide element together with the holding element can be rotated relative to the further element that contains the valve seat and to the valve housing (12) if the valve piston is located in its end position.

9 Claims, 2 Drawing Figures

SHUT OFF VALVE FOR FLUIDS

This invention relates to a shut-off valve for fluids, preferably one that is for sanitation valves, comprising a valve housing, a valve piston and a valve head, these being axially adjustable by means of an operating element such as a handwheel, and being such that they can be lowered to or raised from a valve seat, in which regard the valve head being arranged up-stream from the valve seat.

A corresponding shut-off valve in the preferred form of a water tap is disclosed in German Patent Application No. 29 30 691. The arrangement of the valve head in relation to the valve seat and the direction of flow of the fluid entails the advantage—among others—that the pressure of the fluid in the direction of fall is applied to the valve head, this being intended to ensure that a good shut-off is ensured even if the valve is left off for long periods of time. In order to ensure, however, that a continued application of pressure caused by the handwheel on the valve head causes no unnecessarily rapid wear, and thus to contribute to a marked decoupling between the forces created by the fluid and those for manual adjustment, an elastic coupling element is introduced between the valve head and the screw element. In addition to these costly design options, there is on the valve stem a sealing ring that is intended to ensure that if the handwheel is overtightened no uncontrolled large overload occurs between the valve head and the valve seat, since if this happens the necessary sealing will be disrupted after a very short period.

In addition to the shut-off valve for fluids described above other elements of this kind, e.g., water taps, are already familiar; in these, in order to close the valve the valve head is lowered against the flow onto the valve seat and pressed against this as a result of the force exerted, for example, by a shaft. On the other hand, the valve is opened if the valve head is raised off the valve seat in the direction of flow of the fluid. Of course, in a shut-off valve of this kind, which exists in practically all sanitation valves, there are sealing problems, with the result that after a prolonged period of use nothing can be done about the fact that fluid will drip out of the shut-off valve. Further disadvantages in a design of this type that pressure shocks that occur in the lines leads to rapid wear. In addition, there is also the disadvantage that if a corresponding water tap is used, for example in a domestic water system that is used to pipe in very hard water and these lead to the fact that greater closing forces will have to be applied, and these lead, unavoidably, to failure and leaks. Thus it is necessary to replace the rubber seal—worn away by erosion and cavitation—very frequently.

It is the task of this invention to configure a shut-off valve for fluids, of the sort described above, in such a manner that, in addition to almost complete sealing even over longer periods of time the wear of the elements that are used is kept very small and that the same time it is ensured that it is impossible to over-tighten the valve i.e., application forces between the valve seat and the valve head do not occur to the extent that they can lead to an unforseen failure.

Under the terms of the invention, this task is solved by the fact that the valve piston is picked up by a holding element, this being movable by a cylindrically configured guide element to ensure the axial movement, the (lower) edge area of which is taken up by the valve body, and which operates alternately with the other (upper) edge area with a further element that holds the valve seat.

In other words, the shut-off valve according to the invention is composed of very few components, not all of which must be of brass, but can preferably be of plastic, for example, lexan, without there being any danger of failure.

Because of the simple structural elements and the fact that plastic is used as the production material the advantage, among others, that is achieved is that manufacturing costs are sharply reduced in comparison with other familiar shut-off valves, with the added advantage that the product is considerably lighter than familiar types, this having a beneficial effect on transportation and storage. At the same time, the valve housing and the dimensions of the element that accomodates the valve seat and the guide element are matched in such a way that it is a simple manner to retrofit the shut-off valve according to the invention in familiar sanitation valves. This means that when the shut-off valve according to the invention is used, for example, in mixing batteries, the valve seat will seat in such a manner as to provide a good seal on a threaded seat of the valve.

The design of the invention is such that a guide element together with the holding element can be rotated against the further element that contains the element and the valve body. Such rotation, that can be likened to a slip clutch, takes place if the valve is fully open or closed and the operator undertakes a further rotation of the hand wheel, which ensures that holding element that accomodates the valve piston undergoes no axial movement when in the open position, or that this does not take place between the valve head and the valve seat in the closed position, respectively. Further, in one embodiment the valve body can be rotated in relation to the holding element that accomodates it, about the longitudinal axis, this ensuring, particularly in the closed position, that there is no wear between the valve seat and the valve head if, for example, the guide element with the holding element is rotated in relation to the valve seat or the valve housing, respectively.

In a further embodiment of the invention, the holding element consists of two cylindrical main sections that are in the main of different diameters, the one of lesser diameter acting in alternation with the guide element and the other section being located along the inner wall of the valve body or housing, respectively, this being configured as a hollow cylinder, in which regard the displacement of the holding elements axially upwards in the direction of the flow being limited by the transition that is formed as a step that abuts against the lower edge of the area of the guide element that extends within the valve body.

Furthermore, it is preferred that the interior space of the guide element in not round in cross section, but is preferably oval or the like, this corresponding to the cross section of the main section of the holding element that is of the lesser diameter. By this means it is ensured that the rotational movement created, for example, by a shaft that works in conjunction with the hand wheel, is converted into a translational movement that is manifested in a displacement of the valve piston in the direction of flow or against it, at least until the shut-off valve is not in its completely closed or completely open position, respectively.

With regard to the main sections, that have been described as cylindrical, it should be noted that only individual sections between the holding element interact with the interior space of the valve housing in order to avoid frictional losses as far as possible, to ensure ease of operation of the valve.

In addition, friction is also reduced, and thus ease of operation ensured in that the interior space of the guide element expands in the direction of the valve seat, without, however, the sector of the holding element having the lesser diameter being able to relate relative to this.

In order that when the valve is open—when the valve body is raised from the valve head—the fluid flowing in the direction of the valve housing can reach an outlet, according to another version the element that has the valve seat, that is preferably in the form of a hollow cylinder having holes in its walls. Naturally, the design of the invention is such that the guide element that in the main is also configured as a hollow cylinder and which has a step that acts with the valve housing is also configured in such a manner that fluid can flow through the ports in the walls.

In order that the holding element can turn in relation to the connection that accomodates the valve element, in another version of the invention the upper free end of the holding element is concave, or approximately so, in that the lower correspondingly convex or approximately convex free edge is associated with the free end of the element that accomodates the valve element 58, or vice versa.

As has been mentioned, the axial movement of the holding element is preferably caused by an interaction of a shaft that is operated by an operating element such as for example, a hand wheel of the sanitary valve and the holding element. To this end, the lower main section of the holding element that is of the greater diameter has a coaxially arranged hollow cylinder having a thread in which the shaft engages for the—in the main—axial displacement of the holding element, whereby the axially directed movement against the flow is restricted by a projection arranged on the shaft.

In order to permit the rotation of the valve piston in relation to the holding element that is contained in it, a further version of valve piston according to the invention is provided in the area opposite the valve head with a reinforcement in the form of a bulge that can enter into detent in a suitably configured recess that is arranged axially in the holding element, in which regard it is preferred that at least one continuous slot extends from the recess to the free face side of the upper main section of holding element. This ensures not only simple installation of the valve piston in the holding element, but also their movement relative to each other.

Further details, advantages and characteristic features of the invention can be seen from the drawing of the preferred exemplary versions appended hereto.

DETAILED DESCRIPTION OF THE INVENTION

Figure 1:
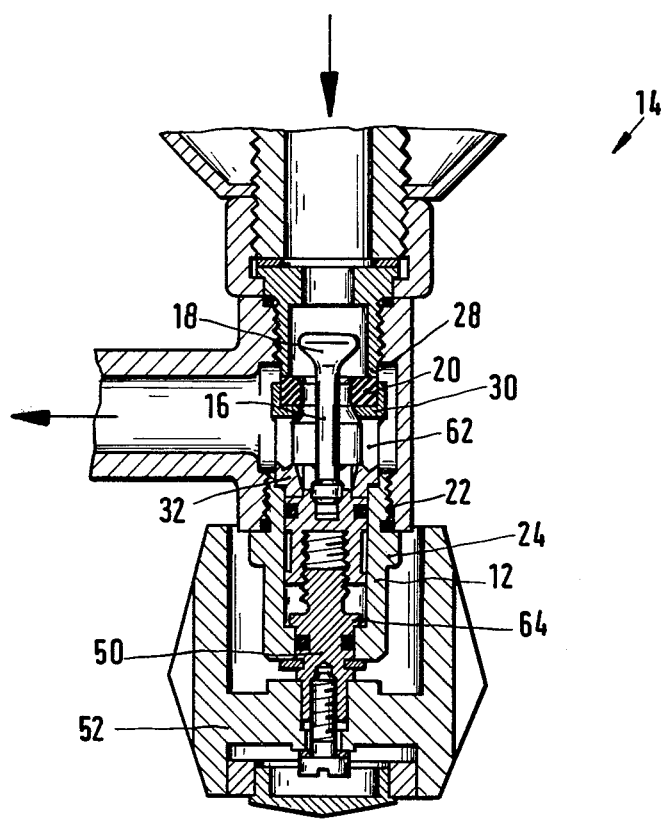
FIG. 1 is a shut-off valve according to the invention incorporated in a water tap.

FIG. 1 is a cross section drawing of a shut-off valve 10 according to the invention incorporated in a sanitation valve such as a water tap 14, details of which are not shown, since this application is not restricted by the particular configuration of the tap. The direction of flow of the fluid passing through the valve is indicated in FIG. 1 by the extended arrow.

In the main, the valve 10 consists of a valve housing 12, in which a holding element 40 is accomodated in such a manner as to be able to slide; in its turn, this has a valve piston 16 with the valve head 18 at its free end. The valve head 18 works with a valve seat 20, in which regard it is preferred that the valve head 18 extends conically from the valve piston 16, in order that it can be brought down into contact with a corresponding sealing surface of the valve seat 20. As is made clear from FIG. 1, the valve housing 12 is screwed into the sanitation valve 14. To this end the valve housing has a thread 22 in an area—preferably upper—. The valve housing is preferably configured as a hollow cylinder also has a projection 24 that limits the thread 22, this abutting against the projection 24 of the sanitation valve 14, if the valve housing is screwed into this to the required extent. Then, the distance between the projection 24 and the free end of the valve seat 20 ensures that this abuts firmly against a stop piece in the sanitation area, such as, for example, a threaded seat 28, so that the fluid can then flow only to the outlet port if it flows through the area between the valve head 18 and the valve seat 20.

With regard to the dimensions of the valve housing 12 or the projection 24 respectively, it is to be noted that these are matched to the valve dimensions, i.e., are based on a ½" or ¾" thread.

The valve seat 20 is housed in an element 30 that is configured as a hollow cylinder, this in its turn acting with a guide element 32, this also having a hollow cylindrical structure; however, it also has a recess in the form of a step 34 in the outer wall, in order that it is arranged on the valve housing 12 in such a manner that a section 36 extends along the inner wall of the valve housing 12. The free edge 38 of the guide element 32 located along the inner side of the valve housing then constitutes a limiting surface for the axial displacement of the holding element 40 that houses the valve piston 16.

In order to ensure an axial displacement of the holding element 40 and thereby of the valve piston 16 in the valve housing 12 the upper section 42 of the holding element acts with the guide element 32, in which regards the internal cross section of the guide element 32 is non-circular, preferably oval or the like, and the cross section of the upper section 42 is suitably matched to this.

The (lower) section 44 that adjoins the upper section 42, that passes along the inner wall of the valve housing 12, has in its turn a recess 46 that is arranged coaxially in the direction of the valve housing base; this recess 46 has an internal thread 48, this acting with a shaft 50 that is operated by means of a hand wheel 52. This means that the rotational movement of the hand wheel 52 or the shaft 50, respectively, is converted into a reciprocating motion by the interaction between the upper section 42 of the holding element 40 and the guide element 32, this ensuring the travel of the valve head 18 from or towards the valve seat 20.

In order to effect the greatest possible reduction in wear between the holding element 40 and the inner wall of the valve, or between the opening of the guide element 32 and the guided upper section 42 of the holding element 40, to ensure the ease of operation of the shut-off valve 10, the opening of the guide element 32 expands conically in the direction of the valve seat 20, so that it is only in the lower section of the guide element 32, which is within the valve housing, that there is contact with the section 42 of the holding element 40 that enters into interaction, and the outer casing of the section 44—that is of a greater diameter in comparison with the section 42—has recesses 54, so that only a small area of the outer wall of section 44 abuts against the inner wall of the valve housing of the outer wall of section 44 abuts against the inner wall of the valve housing. The section 44 can also be provided with an annular ring that can be used to accomodate a sealing ring (O-Ring).

In addition, from the illustration it is clear that the valve housing 42, the shaft 50, the holding element 40, the guide element 32, the holding element 30 that accomodates the valve seat 20 and the valve piston 16 are arranged on the same principle axis, i.e., coaxially.

Figure 2:
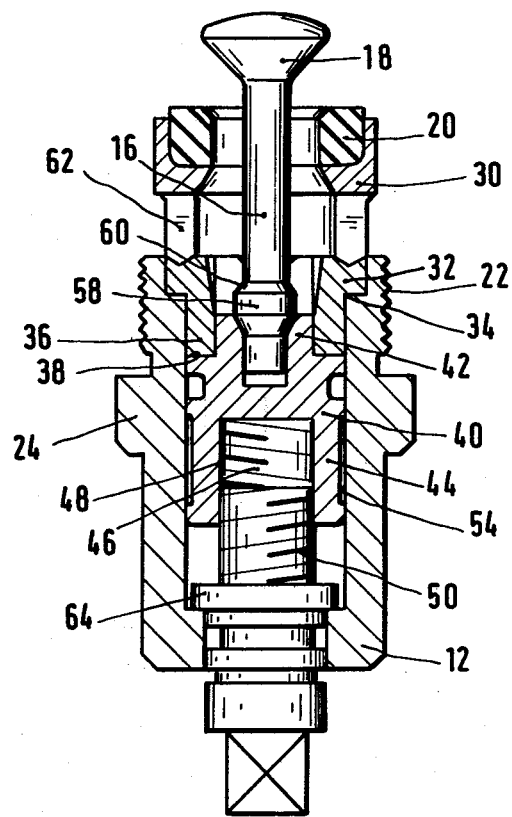
FIG. 2 shows the shut-off valve according to FIG. 1 at enlarged scale.

In the version shown in FIGS. 1 and 2 the connection between the valve piston 16 and the holding element 40 that contains it is in the form of a snap fastening. To this end the valve piston 16 has a reinforcing portion 58 that is configured as a bulge at its lower free end and this enters into detent in a correspondingly formed axially arranged recess 60 in the holding element 40. Thus, slits (that are not shown in the illustration) extend from the recess 60 to the free face side of the upper section 42, thereby ensuring simple installation of the valve piston 16 in the recess 60.

The releasable connection between the valve piston and the holding element 40 ensures that there can be relative movement between the individual elements, this resulting in a good seal between the valve seat 20 and the valve head 18, if, for example, only small lime deposits are to accumulate in this area, for then the valve head 18 can be tilted relative to the valve seat 20, which is scarcely possible in the case of a rigid connection between holding element 40 and the valve piston 16. The latter possibility for connection can also be effected quite readily.

In order that fluid that flows through the shut-off valve 10 according to the invention can flow out the element 30 that houses the valve seat 20 has fluid outlets 62 in its outer walls. Of course, the guide element could extend further in the direction of the valve seat 20 so that continuous apertures through which the fluid flows could be provided in its walls.

In addition, in the exemplary versions, special mention is made of the transition between the guide element 32 and the element 30 that houses the valve seat. As is made plain in the sectional drawing, the upper free edge area of the guide element 32 is V-shaped and the lower free edge of the element 30 is suitably matched to this. This configuration ensures that there can be a relative movement between the guide element 32 and the limiting elements, i.e., the valve body 12 and the element 30.

The manner in which the shut-off valve according to the invention operates will now be described in greater detail.

As a result of the movement of the handwheel 52 and thus the shaft 50 and of the interaction between the shaft 50 and the internal thread 48 of the holding element 40 there is a certain travel of this and of the valve piston 16. When this happens travel is restricted on the one side by the inner edge 38 of the guide element 32 and by a projection 64 on the shaft 50, this adjoining the valve housing base 12. If one accepts that a rotation to the left of the handwheel 52 results in holding element 40 moving towards the guide element 32, i.e., against the direction of flow, then the valve head 18 lifts off the valve 20 and the fluid can flow between these elements to the outlet through the ports 62.

The holding element 40 is moved in the direction towards the ledge or lower edge 38 of the guide element 32 the more fluid can reach the outlet. As soon as the step-shaped transition between the sectors 42 and 44 of the holding element 40 abuts against the edge 38 no further travel is possible, i.e., the maximum fluid throughput has been reached. In conventional water taps it is then no longer possible to continue rotation of the handle. As a result of the configuration of the shut-off valve 10 according to this invention, regarding the arrangement of the guide element 32 to the element 30 or to the valve housing 12, respectively, there is now however, a possibility that a further rotation of the hand wheel 52 can be made, without any damage being caused to the valve. The guide elements 32 can namely be moved between the element 30 and the valve housing 24 in the manner of a slip-coupling, this being facilitated by the special configuration of the abutting or mutually engaging, respectively, edge areas of the elements 30 and 32. Nevertheless, this sliding movement can only take place if the holding element 40 is in its upper limiting position since prior to this the force exerted by the shaft on the holding element are insufficient.

By rotation to the right, there is an immediate reversal—even if the hand wheel 52 has been "over turned"—so that an immediate reduction of the fluid throughput is insured in that the holding element 40 and the valve piston 16 that is constantly connected to this is moved in the direction of the flow. The reciprocal downwards movement can take place until the valve head 18 is pressed tightly against the valve seat 20. Then the sealing effect brought about the pressure of the fluid on the free surface of the valve head that is oriented towards the fluid is increased. Further right hand rotation of the hand wheel 52 results in a permissible loading of the element 30 that accomodates the valve seat 20 to the point that the free lower end of the holding element 40 comes to rest against the projection 64 on the shaft 50. The limiting of the travel that is directed in the direction of the fluid of the valve piston 16 or the holding element 40, respectively, is then produced. If an attempt is then made to continue rotation of the hand wheel, a habit that is frequently noted in the case of already familiar water taps in order to produce a better seal, there is no further axial displacement of the holding element 40 and thus the piston 16, which usually leads to a destruction of the sealing element. However, guide element 32 enters into a relative rotational movement to the valve housing 12 and to the element 30 that contains the valve seat 20 so that the holding element 40 can be turned further by means of the hand wheel 52 or the shaft 50, respectively, without any additional application of pressure of the valve head 18 in the direction of the valve seat 20.

In other words, the permissable loading of the sealing in the shut-off valve according to the invention is constatnly guaranteed even if the operating element that acts on the shut-off valve 10 is over tightened.

Although the exemplary version of the invention has been described on the basis of a sanitation tap, other uses in different areas are also possible. Preferred areas of use are chemical or physics laboratories, in which the shut-off valve is used to regulate liquid and gaseous fluids. In particular, the fact that the elements are of plastic means that this shut-off valve can also be used where aggressive fluids are used. Since it is possible to observe only a very small amount of wear and in addition it is possible to over tighten the shut-off valve, it is not only possible to achieve maintenance free operation but it also means that as a result of the accurate transmission of rotational into reciprocal movement it is always possible to ensure accurate and constant dosing of the fluids.

Furthermore, it should also be noted that, of course, the guided element can be arranged at the base end of the valve housing in order that it can be rotated in relation to this if the valve piston should be displaced beyond an end position.

I claim:

1. A shut-off valve for fluids, preferably for sanitation taps, which includes a valve housing, a valve piston which is displaceable in said valve housing, an operating element such as a hand wheel, a valve seat disposed in said housing, said valve piston having a valve head which can be lowered with said valve piston to engage the valve seat and raised in the direction of flow to move away from said valve seat, the improvement comprising said holding element having means engaging said valve piston so that said valve piston is movable relative to said holding element, said holding element being displaceable in a cylinder-shaped guide element to achieve axial movement with respect to said guide element, said guide element having a lower edge and having an upper edge co-operating with a further element containing said valve seat, said guide element including a freely rotatable member having an end engaging said holding element for displacing said holding element towards said valve seat upon rotation of said rotatable member in one direction and away from said valve seat upon rotation of said rotatable member in an opposite direction, said rotatable member being rotatable in one direction in said holding element until said holding element engages said further element and rotatable in an opposite direction until said holding element engages a portion of said rotatable member whereupon said valve piston, through said means engaging enables the valve piston to move relative to said valve seat so as to prevent damage between the valve piston and the valve seat.

2. A shut-off valve according to claim 1, characterized by the fact that the holding element (40) comprises two cylinder-shaped main segments (42, 46) that are of different diameters, of which the sector (42) having the smaller diameter interacts with the further element (32) and the other sector (44) is extended along the inner wall of the valve housing (12) that is configured as a hollow cylinder, in which regard the axial displacement of the holding element against the direction of flow is limitable by the transition (38) that is configured as a step and abuts against the lower edge of the area of the further element that extends within the valve body.

3. A shut-off valve according to claim 2, characterized by the fact that the interior space of the further element (32) is non-circular in cross-section and is oval to which the cross-section of the main sector (42) of the holding element (40) that is of smaller diameter corresponds.

4. A shut-off valve according to claim 3, characterized by the fact that the interior space of the guide element (32) extends in the direction of the valve seat (20).

5. A shut-off valve according to claim 2, characterized by the fact that the lower main sector (44) of the holding element (40) that is of the greater diameter has a thread (48) in an open coaxially arrangd cylinder shaped chamber (46) in which a shaft (50) that is actuated by the hand wheel (52) for the axial displacement of the holding element (40) in which the axial movement in the direction of the flow is limitable by a projection (64) on the shaft.

6. A shut-off valve according to claim 1, characterized by the fact that the element (30) that has the valve seat (20) is configured as a hollow cylinder in which the walls have apertures (62) to permit the passage of the fluid.

7. A shut-off valve according to claim 1, characterized by the fact that the upper free edge of the further element (32) is concave.

8. A shut-off valve according to claim 1, characterized by the fact that the valve piston (16) at the opposite end the valve piston (18) has a circular reinforcement in the form of a bulge (58) which enters into detent in a suitably configured recess (60) arranged axially in the holding element (40), in which regard it is that at least a continous slot extends from the recess to the free face side of the upper main sector of the holding element.

9. The shut-off valve for fluids as claimed in claim 1 wherein said valve piston and said holding element have a common longitudinal axis and said valve piston is rotatable about said longitudinal axis relative to said holding element.

* * * * *